(No Model.)
W. MULLOY.
HOOF PAD.
No. 372,635. Patented Nov. 1, 1887.
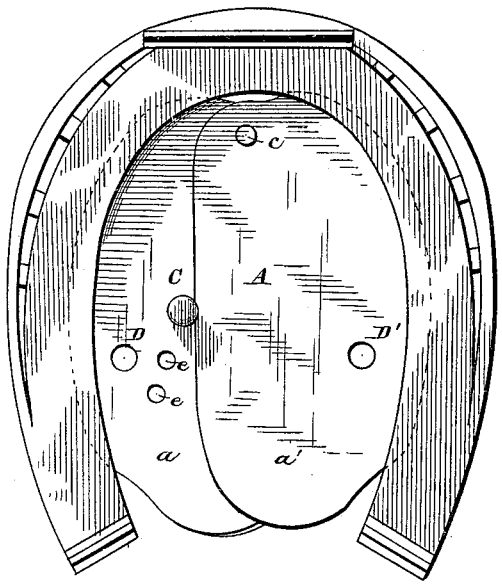
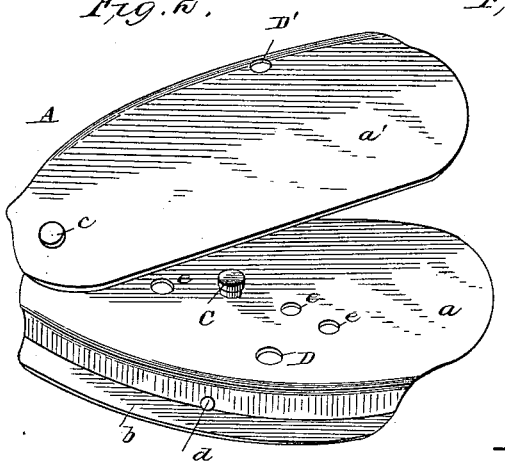
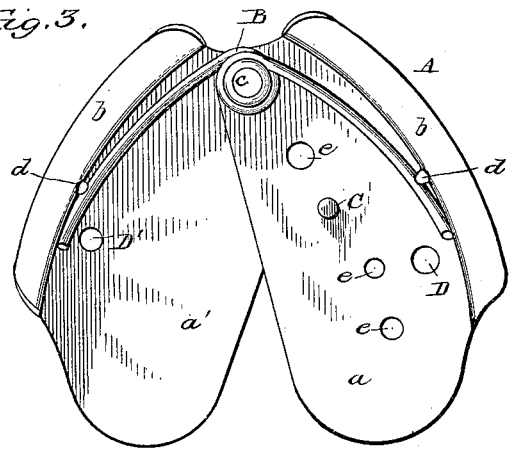
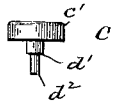
Witnesses
Edwin T. Yewell,
Chas. G. Otte
Inventor
William Mulloy
By his Attorney
Chas. A. Barber
N. PETERS, Photo-Lithographer, Washington, D. C.

UNITED STATES PATENT OFFICE.

WILLIAM MULLOY, OF GREAT FALLS, NEW HAMPSHIRE.

HOOF-PAD.

SPECIFICATION forming part of Letters Patent No. 372,635, dated November 1, 1887.

Application filed March 15, 1887. Serial No. 230,986. (No model.)

*To all whom it may concern:*

Be it known that I, WILLIAM MULLOY, a citizen of the United States, residing at Great Falls, in the county of Strafford and State of New Hampshire, have invented certain new and useful Improvements in Hoof-Pads for Horses' Shoes, of which the following is so full, clear, and exact a description as will enable others skilled in the art to which my invention appertains to make and use the same, reference being had to the accompanying drawings, in which—

Figure 1 is a bottom plan view of my improved pad in position in the shoe. Fig. 2 is a perspective of my improved pad detached from the shoe. Fig. 3 is a top plan view of the pad detached from the shoe. Fig. 4 is a representation of the lug which holds the pad against accidental displacement in the shoe. Fig. 5 represents the key for locking and unlocking the pad.

The object of my invention is to provide a pad for horses' shoes which shall prevent the accumulation of snow or other substances on the under side of the horse's hoof.

Another object of my invention is to provide a hoof-pad which can be used as a pad for keeping any material which may be placed on the under side of the horse's hoof for treating the same, as in the case of corns, thrush, &c.

The objects, generally, of my invention are to provide a cheap and durable hoof-pad, to prevent the accumulation of snow or other substance from balling up in a horse's hoof, and one which can be easily and quickly operated, and which is not liable to get out of order; and it consists in the construction and arrangement of parts, as will be hereinafter more fully described, and particularly pointed out in the claims at the end of the specification.

Referring to the accompanying drawings, the letter A designates the pad, which consists of two plates, $a$ $a'$, constructed to conform to the inner contour of the horseshoe, and made of any suitable material, but preferably of steel. Each of these plates is provided with an outer flange, $b$, which, when in position, fits in between the horse's hoof and the shoe. These two plates are pivoted together at their forward or smaller end by a bolt, $c$, to which is also secured the spring B, which keeps the plates firmly in position in the shoe.

The letter B designates the spring, which is bent in the middle and coiled around the bolt C, and whose ends are sprung against the sides of each plate, respectively, and are further secured from being unlocked by the lips $d$ $d$, struck from the sides of each plate.

The plate $a$ is provided with a series of perforations, $e$ $e$ $e$ $e$, extending at an angle to the line of the inner edge of the plate and extending diagonally across the plate to fit a larger or a smaller shoe, and the rivet or locking-lug C, which serves to keep the plate from being accidentally displaced when in practical use. It is quite apparent that these perforations might be arranged zigzag on the plate without departing from the spirit of my invention.

The letters D D' designate perforations in the plates, into which the key E is inserted for locking or unlocking the device.

The locking-lug C (shown in Fig. 4) is provided with the enlarged portion $c'$, the lower end of which terminates with the shoulder $d'$, and below the shoulder the rivet or lug is reduced to a smaller end or neck, $d^2$. By inserting this neck $d^2$ into one of the perforations $e$ $e$ and riveting the same, the distance between the head of the lug and the lower shoulder, $d'$, will be sufficient to admit the edge of the plate $a'$, which plate will spring into the recess or space beneath the head of the lug, where it will be held rigidly in position.

I am aware that it is old to fasten these plates together by a lip struck from the material along the line where the perforations $e$ $e$ are in this invention; but that means of locking the parts together is not as convenient as this one, and requires more tools and special facilities for its use than does this one. It will be seen at a glance that this may be adjusted to fit any sized shoe and the lug inserted in any one of the perforations $e$ $e$ to lock the plates in position when in place in the shoe.

The operation of my device is as follows: By taking the horse's foot up in one hand and holding the pad in the other by means of the thumb and forefinger, the plates are then pressed toward each other until they lap one over the other sufficiently to allow them to be inserted in the shoe. The pressure of the thumb and forefinger is then removed and the pad sprung into place by means of the spring B. Then, by means of the key E, the device is firmly locked in position and secured from accidental displacement by pressing plate $a'$, so as to make it catch under the head of the rivet C, and the device is then in position in the shoe. When it is desired to unlock the device, the key is inserted in the perforation D', and by pressure of the hand the plate $a'$ is raised up at its inner edge and is released from the lug C, and is then drawn partly over plate $a$ until its flange is disengaged from the shoe.

From the above description, taken in connection with the drawings, it will readily be seen that this device is admirably adapted for the purpose intended, and that it effectually prevents snow or other substances from balling up in the hoof, and can also be used for keeping in place any material which may be used for treating the horse's hoof, as in the case of corns, thrush, hardened hoof, &c.

This device might also be made heavy and used as a weight for race-horses.

It will also be seen from the above that this device can be made very cheaply, and at the same time durable, and readily attached to or detached from the shoe with scarcely any labor.

I do not wish to be understood as limiting myself to the exact construction or length of the flange on the outer edge of the plates, as it is quite obvious that it might be made longer or shorter and serve the same purpose without departing from the general spirit of my invention.

Having now described the objects, uses, and advantages of my invention, what I desire to secure by Letters Patent, and what I therefore claim, is—

1. In a detachable hoof-pad of the character described, the two plates adapted to fit within a shoe, one of which plates is perforated to receive a locking-lug, in combination with a locking-lug which is secured in one of the said perforations in the desired adjusted position, substantially as and for the purposes specified.

2. In a hoof-pad of the character described, a pair of plates pivotally secured together and provided with a spring which forces them apart, one of said plates being provided with a series of perforations to receive a locking-lug, in combination with a locking-lug which may be secured in any desired adjusted position to lock the pad in place in the shoe in one of the perforations, substantially as and for the purposes specified.

3. In a detachable hoof-pad of the character described, the combination of the two plates, one of which is perforated to receive a locking-lug, in combination with a locking-lug provided with an enlarged head, and a shoulder about midway between the head and the reduced end of the locking-lug, which forms a recess between the head of the lug and the locking-plate when the lug is in position in the locking-plate, all constructed and combined to operate substantially as and for the purposes specified.

4. In a detachable hoof-pad of the character described, the combination of two plates pivotally secured together and adapted to fit within a horseshoe, one of said plates being perforated to receive a locking-lug, and both of said plates being provided with a second perforation to receive a key for manipulating the same, in combination with a locking-lug, which is secured within one of the perforations provided for that purpose, and a spring for forcing the plates apart at their free ends, substantially as and for the purposes specified.

In testimony that I claim the above as my invention I hereunto set my hand in the presence of two witnesses.

WILLIAM MULLOY.

Witnesses:
 N. N. HURD,
 J. A. STICKNEY.